Feb. 5, 1924.

1,482,807

H. W. NEWBERG

REGULATOR FOR ROTARY PUMPS AND MOTORS

Filed Aug. 31, 1921

H. W. Newberg
INVENTOR

D. C. Davis
ATTORNEY

Patented Feb. 5, 1924.

1,482,807

UNITED STATES PATENT OFFICE.

HUGH W. NEWBERG, OF ESSINGTON, PENNSYLVANIA, ASSIGNOR TO WESTINGHOUSE ELECTRIC AND MANUFACTURING COMPANY, A CORPORATION OF PENNSYLVANIA.

REGULATOR FOR ROTARY PUMPS AND MOTORS.

Application filed August 31, 1921. Serial No. 497,177.

*To all whom it may concern:*

Be it known that I, HUGH W. NEWBERG, a citizen of the United States, and a resident of Essington, in the county of Delaware and State of Pennsylvania, have invented a new and useful Improvement in Regulators for Rotary Pumps and Motors, of which the following is a specification.

This invention relates to regulators for rotary pumps and motors of the eccentric-displacement type and has for its object the provision of an apparatus of the character designated which shall be capable of controlling the rate of discharge of a fluid from a pump, or the speed of rotation of a motor in a simple and positive manner without altering the disposition of the moving parts of the rotary pump or motor.

Figure 1:
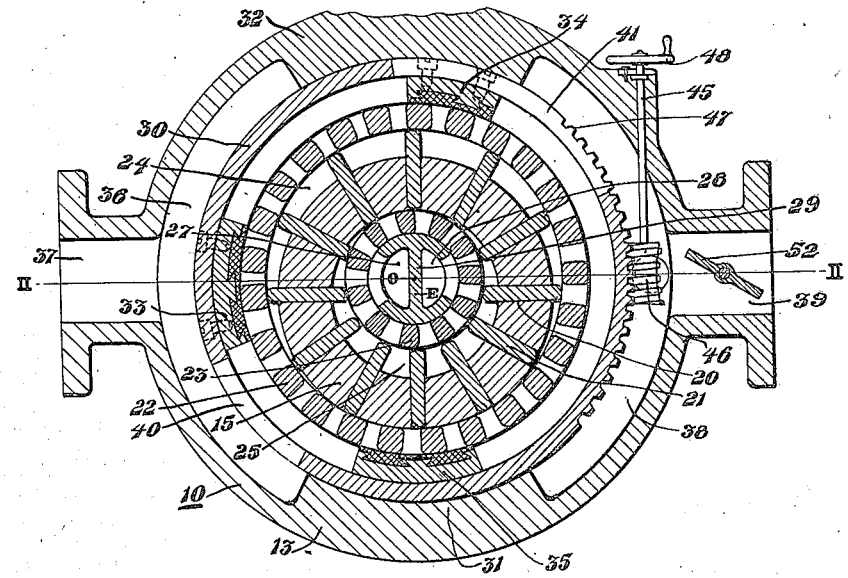
Figure 2:
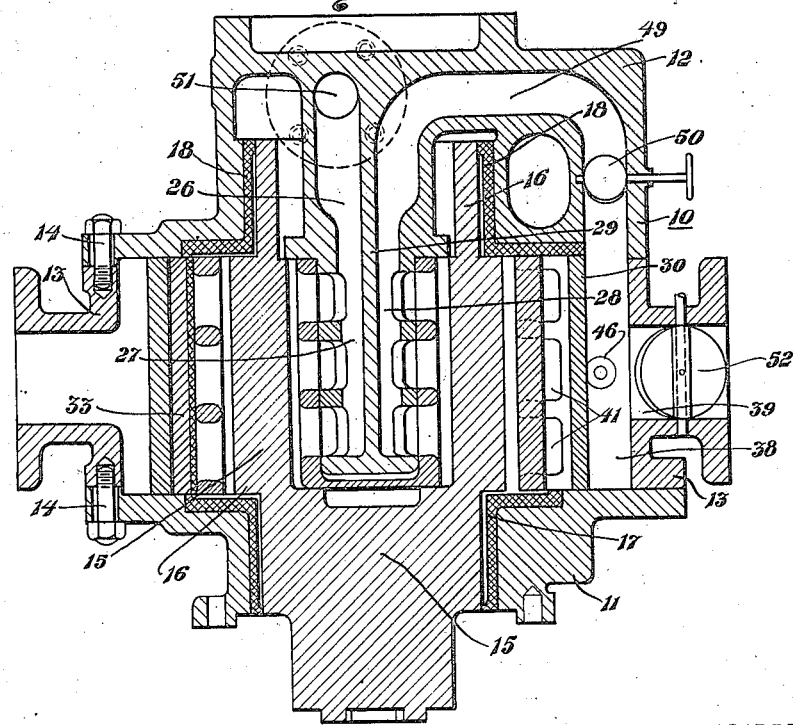

In the drawings, Fig. 1 is a transverse sectional view of a rotary pump or motor equipped with a regulator embodying my invention, and Fig. 2 is a longitudinal sectional view thereof taken on the line II—II of Fig. 1.

It is well understood by those skilled in the art to which this invention relates that a mechanism of the character described herein may be used interchangeably either as a pump or as a motor without alteration of the constructional characteristics of the mechanism. The regulator construction, which forms the subject-matter of the present specification, may be incorporated as an integral part of either a pump or motor of the eccentric displacement type and may serve interchangeably to regulate the effectiveness of the apparatus whether it is employed as a pump or a motor.

For these reasons I do not desire to limit the scope of the present specification to the employment of my novel regulator mechanism in connection with either a pump or a motor, and shall designate herein the apparatus in which my novel regulator mechanism is adapted to be embodied as a pump-motor.

Referring more particularly to the drawing, I show a multiple-stage pump-motor having an outer annular series and an inner annular series of expansible fluid chambers. I indicate at 10 a pump-motor casing comprising end members 11 and 12 and an annular intermediate member 13, the members being secured together as a unit in any suitable manner, as for example, by bolts 14. Located in the casing 10 and extending substantially the length thereof is a cylindrical runner 15 rotatable about at an axis E. A portion of the runner 15 extends through the casing member 11 and is provided with means to receive or transmit rotational movement. The portions of the runner 15 within the casing members 12 and 13 are hollowed out to receive elements of a second stage, as will hereinafter more fully appear.

The central portion of the runner 15 is relatively heavy and is arranged to present heavy flanges 16 to bearing surfaces 17, 18, on the end members 11, 12, which support and guide the runner in its rotational movement. The central portion of the runner is annular in cross section and is provided with a plurality of slots 20 which are adapted to accommodate radially-disposed plate pistons or vanes 21 slidably mounted therein. The outer extremities of the plate pistons 21 frictionally engage an outer, ported cylindrical ring 22 and the inner extremities of the pistons similarly engage an inner, ported cylindrical ring 23, the rings 22, 23 being concentric with respect to an axis O. Each of the said cylindrical rings 22 and 23, and the plate pistons 21 are equal in width to the width of the intermediate member 13 and are thus held in close contact with the end members 11 and 12 to form, in cooperation with the central portion of runner 15, an outer series of annular expansible chambers 24 and an inner series of annular expansible chambers 25, hereinafter more fully described.

The end casing member 12 carries the open end of the cylindrical runner 15 in the bearings 18 and is provided with a hollow stem portion 26 which extends eccentrically into the hollow runner and supports therein the inner, ported cylindrical ring 23. The stem portion 26, because of its peculiar function in directing fluid through the second stage of the apparatus, may be termed in this specification an inner casing member. The inner casing member 26 is provided with a ported inlet chamber 27 and a ported outlet chamber 28, the chambers being separated by a diametrically disposed wall 29.

A cylindrical regulator ring 30, of greater diameter than the ported ring 22, is supported within the casing member 13 in concentric relation to the cylindrical rings 22, 23, between abutments 31, 32, disposed diametrically of the casing and centrally of a plane determined by the axes E and O. The regulator ring 30 is equal in width to the width of the central casing member 13 and engages the end members 11, 12, with a close contact. A sealing shoe 33 and a bearing shoe 34, coextensive in length with the width of the ring 30, are secured to the ring 30 and are arranged to engage the outer ported ring 22. A stationary bearing shoe 35 is provided in a radial alinement with the abutment 31 and is fitted between the rings 22 and 30 and the end members 11 and 12 in such manner as to form a packing gland. The abutments 31, 32, in cooperation with the regulator ring 30, sealing shoe 33, and bearing shoe 35, serve to divide the space within the casing 10 into an inlet chamber 36 having an inlet port 37 and an outlet chamber 38 having an outlet port 39.

It is evident from the above description that the inner casing member 26 and the inner and outer ported cylindrical rings 22, 23 are concentric to each other and are positioned eccentrically with respect to the runner 15. The relative eccentric rotation of the runner 15 with its associated plate pistons 21 between the ported cylindrical rings 22, 23 produces the two series of expansible fluid chambers 24, 25, each of the outer series of chambers 24 having a minimum fluid capacity when adjacent the abutment 31 and a maximum fluid capacity when adjacent the abutment 32, and each of the inner series of chambers 25 having a minimum fluid capacity when adjacent the abutment 32 and a maximum fluid capacity when adjacent the abutment 31.

The regulator ring 30 is provided with slots 40 which establish communication between the inlet chamber 36 and the expansible chambers 24, and with similar slots 41 forming a discharge communication between the expansible chambers 24 and the outlet chamber 38.

The regulator ring 30 and the sealing shoes 33 carried thereby are rotatable through an arc of aproximately 90 degrees. The amount of fluid which can enter any expansible chamber 24 is determined by the position of the sealing shoe 33 with respect to the expansible chambers on the inlet side of the pump, since the ring 30 and shoe 33 inhibit the entrance of fluid into any chamber 24 after the chamber in its rotational movement has progressed beyond the sealing shoe 33. The adjustment of the ring 30 and shoe 33 may be effected by means of any suitable mechanism. As shown, a rotatable stem 45 is suitably journaled in the casing member 13 and carries at its inner end a worm 46 adapted to engage co-operating teeth 47 formed integrally in the ring 30. A hand wheel 48 may be secured to the outer stem 46 for convenience in operation.

The inlet chamber 27 of the inner casing member 26 may be connected to the outlet chamber 38 by means of a passage 49 formed within the end member 12, which passage may be provided with a shut-off valve 50. The outlet chamber 28 of the inner casing member 26 may also be provided with a suitable discharge port 51. A suitable valve 52 may be provided in the outlet port 39, if desired.

Assuming that the apparatus above described is to be operated as a single stage motor, the valve 50 should be closed, and the valve 52 should be opened. Oil, or other suitable fluid under pressure, is admitted through the port 37, thence through the chamber 36, the slots 40 and the ported ring 22 into the expansible chambers 28 causing a clock-wise rotation (Fig. 1) of the vanes 21 and runner 15, and the oil is discharged from the chambers 24 through slots 41 into the outlet chamber 38, a mode of operation characteristic of motors of the rotary, eccentric-displacement type. In starting the motor, the regulator ring 30 should preferably be turned so that the sealing shoe 33 is approximately in alinement with the abutment 32. Each of the expansible chambers then receives oil to its full capacity. It is apparent that if the quantity of oil received at the inlet port 37 is constant, the speed of the motor is under these conditions the minimum necessary to handle the amount of oil delivered to the motor. Rotating the ring 30 in a counter-clock-wise direction, toward the position shown in Figure 1, so as to bring the sealing shoe 33 in a position to effect an early cut-off of oil to the expansible chambers, it is evident that the amount of oil delivered through the slots 40 to each of the expansible chambers 24 is gradually decreased and, consequently, the motor necessarily travels at an increasing rotational speed in order to handle the constant quantity of oil received at the inlet port 37. By rotating the regulator ring 30 to different positions on the inlet side of the motor, the amount of fluid entering each expansible chamber and hence the speed of the motor may be varied within wide limits.

The above described regulator mechanism modifies the operating characteristics of an eccentric-displacement motor in a peculiarly advantageous manner. When the sealing shoe is rotated to permit large quantities of oil to enter each expansible chamber, not only is the speed of the motor diminished, but the rotational torque is decidedly increased due to the enlarged piston areas exposed to the high pressure oil. This feature adapts a motor thus constructed exceptionally well for the driving of machinery requiring a high rotational torque at low speeds and a decreased rotational torque at higher speeds, as for example, the operating mechanism of furnace stokers.

Again, assuming that the apparatus herein described is to be employed as a pump, with the bearing shoe 33 as shown in Figure 1, a minimum amount of oil is permitted to enter into the expansible chambers 24 and consequently a minimum quantity is discharged into the outlet chamber 38. A movement of the regulator ring 30 and the bearing shoe 33 in a clock-wise direction (Fig. 1) increases the amount of oil which may enter into each expansible chamber 24 and hence increases the output of the pump. To operate the apparatus as a single stage pump, the valve 50 should be closed and the valve 52 should be opened. It is obvious that my novel ring regulator is well adapted for use with rotary eccentric-displacement pumps of the single stage type.

It is often desirable, however, to operate a two-stage pump so as to deliver oil at different pressures. The specific construction illustrated in the drawing is adapted to accomplish this result. When the first stage pump is operated in conjunction with the inner second stage pump for this purpose both the valves 50 and 52 should be open. It is apparent from the above description of the operation that the rotational movement of the regulator ring 30 and the bearing shoe 33 serves to control the capacity of the outer first stage pump without varying the capacity of the inner second stage pump. Such an operating characteristic is particularly advantageous in connection with turbine operation, in which it is desired to furnish large amounts of oil for lubricating purposes at relatively low pressure and to furnish small quantities of oil at a high pressure for the oil-governor apparatus of the turbine. Thus, when operating the apparatus disclosed as a two-stage pump, the major portion of the oil passing through the first-stage pump may be delivered through the port 39 for lubricating purposes, and the amount so delivered may vary within wide limits by the adjustment of the regulator ring 30. The capacity of the second-stage pump, however, is not varied by the movement of the regulator ring 30 and, consequently, oil under pressure is delivered to the governor mechanism from the second stage pump at a substantially uniform pressure.

It is apparent from the above description that my novel regulating mechanism is capable of embodiment generally in pumps and motors of the eccentric-displacement type and that it is not limited in its application to any specific pump or motor of this class.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. In combination in an apparatus of the character described, a casing member having inlet and outlet means; a rotatable means embodying an annular series of expansible chambers having fixed maximum volumetric capacities; and means associated with the expansible chambers for regulating the amount of fluid permitted to enter each expansible chamber.

2. In combination in an apparatus of the character described, a casing member having inlet and outlet means; a rotatable means embodying an annular series of expansible chambers having fixed maximum volumetric capacities; and means associated with said inlet means and with the expansible chambers for regulating the amount of fluid permitted to enter each expansible chamber.

3. In combination in an apparatus of the character described, a casing member having inlet and outlet means; a rotatable means embodying an annular series of expansible chambers having fixed maximum volumetric capacities; and an adjustable means interposed between the inlet means and the expansible chambers and adjacent to the inlet means for regulating the amount of fluid permitted to enter each expansible chamber.

4. In combination in an apparatus of the character described, a casing member having inlet and outlet means; a ported cylindrical ring; a rotatable element disposed within and in fixed eccentric relation to the cylindrical ring and carrying a plurality of radial vanes; the cylindrical ring, the rotatable element and the vanes cooperating to form an annular series of expansible chambers; and an adjustable means interposed between the inlet means and the expansible chambers and adjacent to the inlet means for regulating the amount of fluid permitted to enter each expansible chamber.

5. In combination in an apparatus of the character described, a casing member having inlet and outlet means; a ported cylindrical ring; a rotatable element disposed within and eccentric to the cylindrical ring and carrying a plurality of radial vanes; the cylindrical ring, the rotatable element and the vanes cooperating to form an annular series of expansible chambers; a regulator ring surrounding the ported ring and carrying a sealing shoe adjacent the inlet means arranged to inhibit the entry of fluid into the expansible chambers, said ring having openings for the admission of fluid at the side of the bearing shoe on which the expansible chambers begin to increase in volume; and means for rotating the regulator ring for varying the amount of fluid permitted to enter the expansible chambers.

6. The combination with a rotary eccentric displacement pump or motor of fixed displacement capacity having an inlet means and an outlet means and an annular series of rotatable expansible chambers; of an adjustable means interposed between the inlet means and the expansible chambers and adjacent to the inlet means for regulating the amount of fluid permitted to enter each expansible chamber.

7. The combination with a rotary eccentric displacement pump or motor having an inlet means and an outlet means and an annular series of rotatable expansible chambers; of a regulator ring surrounding the expansible chambers and carrying a sealing shoe adjacent the inlet means, said ring having openings for the admission of fluid at the side of shoe on which the expansible chambers begin to increase in volume; and means for rotating the regulator ring for varying the amount of fluid permitted to enter the expansible chambers.

8. The combination with a rotary eccentric displacement pump or motor comprising inner and outer casing members each having inlet and outlet means; a passage connecting the outlet of the outer casing with the inlet of the inner casing; a rotary element carrying radial vanes; the rotary element, the vanes and the casing members cooperating to form an outer annular series of expansible chambers and an inner annular series of expansible chambers; of a regulator ring surrounding the outer annular series of expansible chambers and carrying a sealing shoe adjacent the inlet means of the outer casing, said ring having openings for the admission of fluid at the side of the shoe on which the expansible chambers begin to increase in volume; and means for rotating the regulator ring for varying the amount of fluid permitted to enter the outer series of expansible chambers, whereby the effectiveness of the outer series of expansible chambers may be varied without varying the capacity of the inner series of expansible chambers.

9. In combination in a rotary eccentric displacement pump or motor, a casing member having a cylindrical chamber provided with inlet and outlet means, a rotatable means disposed within the cylindrical chamber and in fixed eccentric relation thereto and embodying an annular series of expansible chambers, and means associated with said expansible chambers for regulating the amount of fluid permitted to enter each expansible chamber.

10. In combination in a rotary eccentric displacement pump or motor, a casing member having a cylindrical chamber provided with inlet and outlet means, a rotatable means disposed within the cylindrical chamber and in fixed eccentric relation thereto and embodying an annular series of expansible chambers, an annular ring disposed in said cylindrical chamber between said casing member and said rotatable means and having ported means for admitting fluid to said expansible chambers, and means for rotating said ring for cutting-off the delivery of fluid to said expansible chambers at any predetermined point during the enlargement of said expansible chambers, whereby the said chambers may carry to the outlet means fluid varying in amount from zero to full capacity of the expansible chambers.

In testimony whereof, I have hereunto subscribed my name this 17th day of August, 1921.

HUGH W. NEWBERG.